(12) United States Patent
Chiang et al.

(10) Patent No.: US 11,353,772 B1
(45) Date of Patent: Jun. 7, 2022

(54) PHOTONIC DEVICE STRUCTURE AND METHOD OF MANUFACTURING THE SAME, AND ELECTRO-OPTIC WAVEGUIDE

(71) Applicant: City University of Hong Kong, Kowloon (HK)

(72) Inventors: Kin Seng Chiang, Kowloon (HK); Jingdong Luo, Kowloon (HK)

(73) Assignee: City University of Hong Kong, Kowloon (HK)

(*) Notice: Subject to any disclaimer, the term of this patent is extended or adjusted under 35 U.S.C. 154(b) by 0 days.

(21) Appl. No.: 17/137,806

(22) Filed: Dec. 30, 2020

(51) Int. Cl.
  *G02F 1/355* (2006.01)
  *G02F 1/065* (2006.01)
  *G02F 1/01* (2006.01)

(52) U.S. Cl.
  CPC ............ *G02F 1/3558* (2013.01); *G02F 1/065* (2013.01); *G02F 1/0136* (2013.01); *G02F 2202/022* (2013.01)

(58) Field of Classification Search
  None
  See application file for complete search history.

(56) References Cited

U.S. PATENT DOCUMENTS

| | | | | |
|---|---|---|---|---|
| 5,016,959 A * | 5/1991 | Diemeer | G02F 1/065 | 385/16 |
| 5,039,186 A * | 8/1991 | Man | G02F 1/065 | 385/122 |
| 5,276,745 A * | 1/1994 | Revelli, Jr. | G02B 6/1245 | 369/44.12 |
| 6,782,166 B1 * | 8/2004 | Grote | G02F 1/065 | 385/131 |
| 8,565,569 B2 | 10/2013 | Jen et al. | | |
| 2008/0075413 A1 * | 3/2008 | Jen | G02B 6/1221 | 385/145 |
| 2009/0148717 A1 * | 6/2009 | Jen | G02F 1/065 | 428/522 |
| 2010/0098424 A1 * | 4/2010 | Ho | G02F 1/2255 | 398/116 |
| 2012/0157584 A1 * | 6/2012 | Chen | G02F 1/3558 | 524/84 |
| 2015/0333196 A1 * | 11/2015 | Shin | H01L 31/08 | 257/29 |
| 2015/0346521 A1 * | 12/2015 | Williams | G02F 1/035 | 385/2 |
| 2016/0313579 A1 * | 10/2016 | Yokoyama | G02B 6/125 | |

FOREIGN PATENT DOCUMENTS

WO   WO 2006/127028 A2 * 11/2006
WO   WO 2015/084267 A1 *  6/2015

OTHER PUBLICATIONS

W. Wang et al. Graphene electrodes for electric poling of electro-optic polymer films. Optics Letters, 45:8:2383-2386, Apr. 15, 2020. (Year: 2020).*

* cited by examiner

*Primary Examiner* — Michael Stahl
(74) *Attorney, Agent, or Firm* — Renner Kenner Greive Bobak Taylor & Weber (57) ABSTRACT

A photonic device structure includes: an electro-optical structure including a layer of optical material sandwiched by a pair of electrodes, wherein the layer of optical material is arranged to undergo an electro-optic activity when subjected to a voltage bias across the pair of electrodes; and a cladding layer adjacent to the electro-optical structure.

21 Claims, 6 Drawing Sheets

PHOTONIC DEVICE STRUCTURE AND METHOD OF MANUFACTURING THE SAME, AND ELECTRO-OPTIC WAVEGUIDE

TECHNICAL FIELD

The invention relates to a photonic device structure and a method of manufacturing the same. The invention also relates to an electro-optic waveguide including the photonic device structure.

BACKGROUND

Photonic devices, such as lasers, LEDs, modulators and photodetectors, are exploited in various applications due to their capability in light generation, detection, or manipulation. For example, photonic devices may be used as a waveguide for guiding electromagnetic waves in the optical spectrum.

Recently, photonic devices including electro-optic (EO) polymer materials, e.g., high-performance EO modulators containing EO polymers that possess strong, ultrafast EO effects, silicon modulators based on EO polymer that show low driving voltages and large bandwidths, etc., are gaining attentions in the field.

SUMMARY

In a first aspect, there is provided a photonic device structure comprising: an electro-optical structure including a layer of optical material sandwiched by a pair of electrodes, wherein the layer of optical material is arranged to undergo an electro-optic activity when subjected to a voltage bias across the pair of electrodes; and a cladding layer adjacent to the electro-optical structure.

In one embodiment of the first aspect, the electro-optic activity includes a change in the electric-optic coefficient of the layer of optical material.

In one embodiment of the first aspect, the electric-optic coefficient is 80-90 pm/V at a wavelength of 1541 nm or 100-120 pm/V at a wavelength of 1300 nm.

In one embodiment of the first aspect, the electro-optic activity includes a change in the refractive index of the layer of optical material.

In one embodiment of the first aspect, the refractive index is changed from an isotropic refractive index to an anisotropic refractive index.

In one embodiment of the first aspect, each of the pair of electrodes comprises a non-metallic portion.

In one embodiment of the first aspect, the non-metallic portion comprises graphene.

In one embodiment of the first aspect, the non-metallic portion comprises one or more layers of graphene films.

In one embodiment of the first aspect, each of the pair of electrodes further comprises a metallic portion.

In one embodiment of the first aspect, the metallic portion comprises gold.

In one embodiment of the first aspect, the metallic portion is positioned on an edge of each of the pair of electrodes.

In one embodiment of the first aspect, the layer of optical material comprises an organic non-linear optical material.

In one embodiment of the first aspect, the layer of optical material comprises a host polymer containing a guest non-linear optical material.

In one embodiment of the first aspect, the host polymer is selected from a group consisting of: a side-chain polymer and a dendrimer.

In one embodiment of the first aspect, the guest non-linear optical material is selected from a group consisting of: a plurality of non-linear optical chromophores, a plurality of binary non-linear optical chromophores, and a plurality of non-linear optical chromophores.

In one embodiment of the first aspect, the electro-optic activity includes a change in alignment of the guest non-linear optical material.

In one embodiment of the first aspect, the guest non-linear optical material is aligned with a non-centrosymmetric order when subjected to the voltage bias across the pair of electrodes.

In one embodiment of the first aspect, the layer of optical material comprises a pyroelectric material.

In one embodiment of the first aspect, the layer of optical material comprises a ferroelectric material.

In one embodiment of the first aspect, the ferroelectric material is arranged to generate an electrostatic field when subjected to the voltage bias.

In one embodiment of the first aspect, the electrodes are arranged to generate an electric field to the layer of optical material upon subjected to a voltage bias.

In one embodiment of the first aspect, the layer of optical material is further arranged to undergo the electro-optic activity when heated at a temperature close to the glass transition temperature of the optical material.

In one embodiment of the first aspect, the layer of optical material is further arranged to undergo the electro-optic activity when cooled from a temperature close to the glass transition temperature of the optical material.

In a second aspect, there is provided an electro-optic waveguide comprising the photonic device structure in the first aspect.

In one embodiment of the second aspect, the pair of electrodes comprises an upper electrode above the layer of optical material, and a lower electrode between the layer of optical material and the cladding layer, the upper electrode comprises a patterned structure.

In a third aspect, there is provided a method of manufacturing a photonic device structure. The method comprises the steps of: wet-transferring a first layer of conductive material onto a cladding layer to form a first electrode; coating a layer of optical material on the first electrode; and transferring a second layer of conductive material onto the layer of optical material to form a second electrode. The layer of optical material is arranged to undergo an electro-optic activity when subjected to a voltage bias across the first and second electrodes.

In one embodiment of the third aspect, the method further comprises, after forming the second electrode, heating to a temperature close to the glass transition temperature of the optical material to obtain a uniform contact between the first and second electrodes and the layer of optical material.

In one embodiment of the third aspect, each of the first and second layers of conductive material comprises graphene.

In one embodiment of the third aspect, the first layer of conductive material further comprises a polymer. The method further comprises, before coating the layer of optical material, the step of removing the polymer from the first layer of conductive material.

In one embodiment of the third aspect, the step of transferring a second layer of conductive material comprises transferring a plurality of the second layer of conductive material to form the second electrode.

BRIEF DESCRIPTION OF THE DRAWINGS

Embodiments of the invention will now be described, by way of example, with reference to the accompanying drawings in which.

DETAILED DESCRIPTION

The inventors have devised that, for electro-optic (EO) devices using an EO polymer film, it is desired to obtain a large EO coefficient, which would favorably affect the transverse-magnetic (TM) polarization. To obtain a large EO coefficient from an EO polymer film, it is necessary to align the chromophores in the EO polymer. This can be done by an electric poling process, where a sufficiently strong electric field is applied across the EO polymer film, while the film is heated up to its glass transition temperature. Traditionally, metal and indium tin oxide (ITO) electrodes are used in electric poling.

Figure 1:
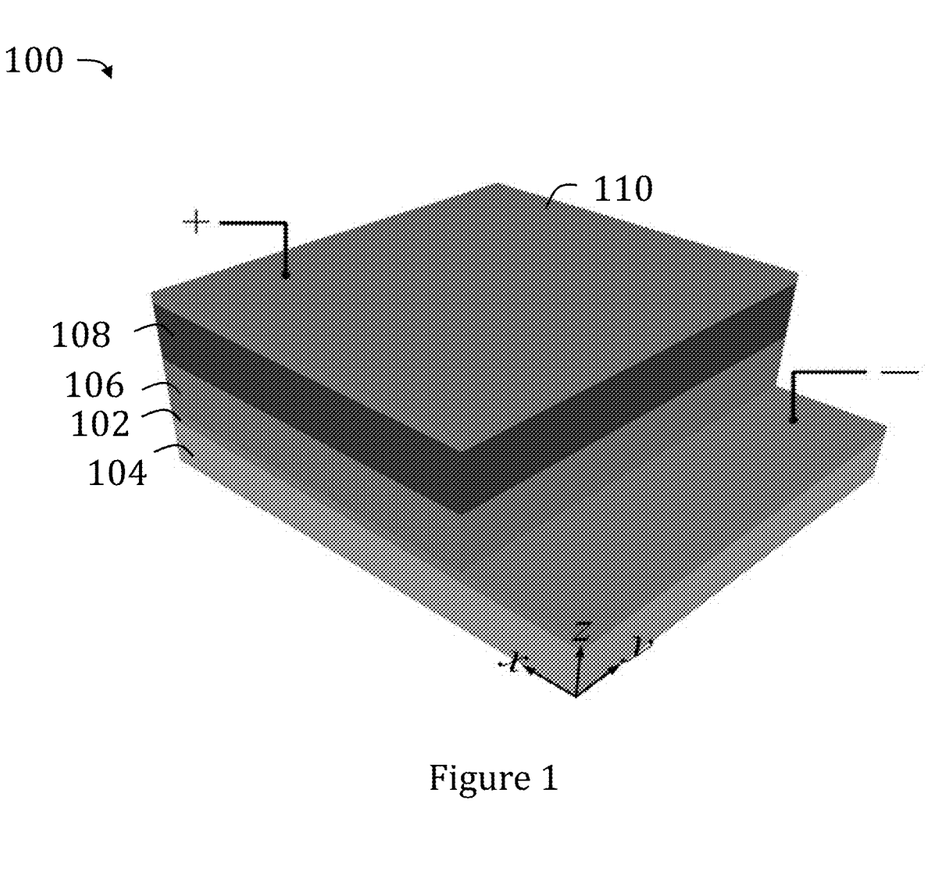
FIG. 1 is a schematic diagram of an example photonic device structure, where light propagates in the y direction.

FIG. 1 shows an example photonic device structure 100 configured as an EO polymer thin-film waveguide. The structure 100 includes a bottom ITO electrode 102 deposited on a substrate 104, a cladding 106 between the bottom electrode 102 and an EO polymer film 108, which in turn is in direct contact with a top (Au) electrode 110. The top electrode 110 must be removed after poling; otherwise it would adversely affect the operation. Because the bottom electrode 102 cannot be removed after poling, the cladding 106 must be thick enough to serve as a buffer layer between the electrode 102 and the EO polymer film 108 to keep the metal-induced absorption loss low.

The inventors have found that the waveguide 100 may exhibit limitations such as requiring a high poling voltage and complicated manufacturing processes. Due to high loss of metal electrode in the conventional waveguides, there has to be a buffer layer between metal electrode and EO polymer layer to attenuate the optical loss. Such device configuration leads to complication of waveguide fabrication and reduces the poling efficiency of EO material. The choice of a buffer material that has both high conductivity and good optical transparency is a challenge. Sol-gel conductive cladding, whose resistivity is smaller than that of EO polymer by orders of magnitude, is usually used as the buffer material, but its synthesis involves complicated chemical processes.

The inventors have devised, through their own research, trials and experiments, that an improved photonic device structure may be provided with the use of graphene electrodes for electric poling of EO polymer to exempt the need of using buffer layers and minimize the poling voltage, based on a finding that a graphene film embedded in or placed on a low-index-contrast waveguide does not induce a significant loss to the TM waves. This property of graphene has been explored for the realization of a lithium niobate EO grating, a polymer thermo-optic switch, and an all-optical switch to improve their performances. Graphene holds the advantages of excellent conductivity and low-loss at communication band. As such, using graphene poling electrodes, buffer layers between EO layer and electrodes are no longer necessary. This will effectively improve the poling efficiency and simplify the device fabrication.

Figure 2:
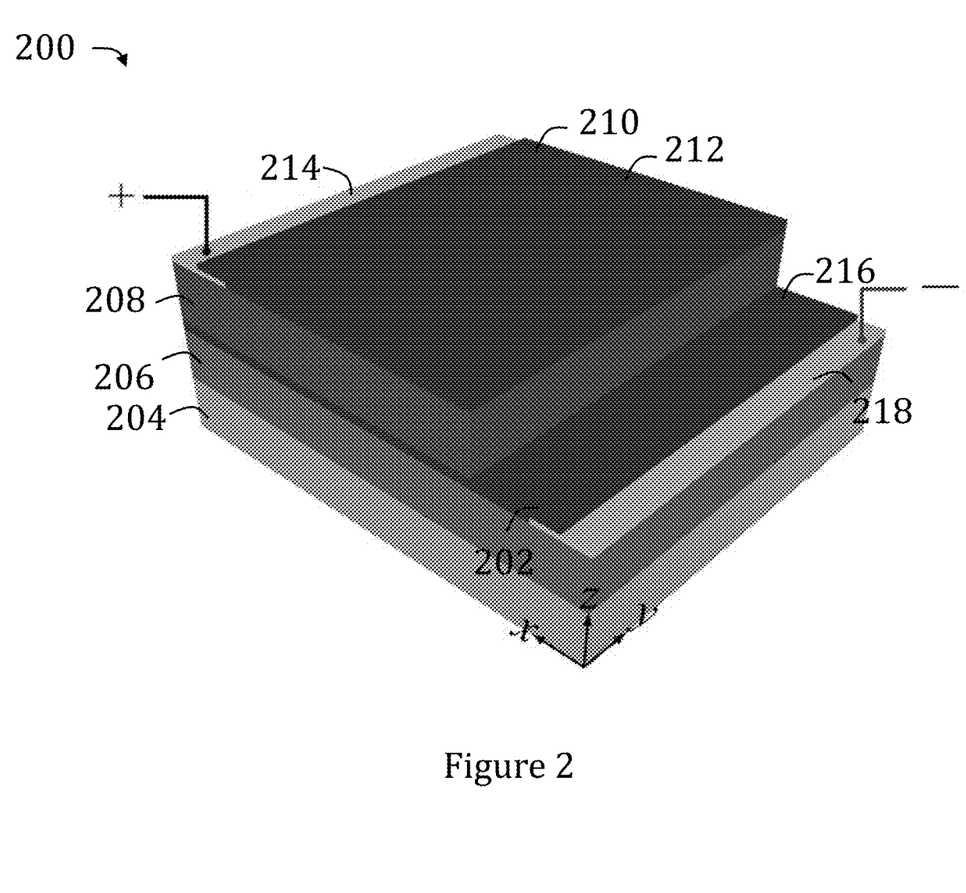
FIG. 2 is a schematic diagram of a photonic device structure in accordance with one embodiment of the invention, where light propagates in the y direction.

FIG. 2 shows a photonic device structure 200 in accordance with a preferred embodiment of the invention. The illustrated photonic device structure 200 is configured as a slab waveguide capable of exhibiting an electro-optic effect that alters the optical properties of the photonic device structure 200 in response to an electric field. The illustrated photonic device structure 200 may be used in applications other than as an EO waveguide. For example, the structure 200 can be widely applied to the processing of organic and polymeric non-linear optical (NLO) materials in a variety of optoelectronic and photonic devices, including electro-optic modulators, silicon-organic hybrid waveguides, optical electric field sensors, new frequency generation, and all-optical Switches. In one example embodiment, the photonic device structure 200 is used in an EO waveguide, with a patterned structure on the upper graphene electrode, forming a modulation electrode.

The photonic device structure 200 includes an electro-optical structure including a layer of optical material 208 sandwiched by a pair of electrodes 202, 210, and a cladding layer 206 adjacent to the electro-optical structure. Specifically, the photonic device structure 200 includes a layered structure formed by different components in the following order: a substrate 204, the cladding 206, and the EO structure including the lower electrode 202, the layer of optical material 208, and the upper electrode 210. In other words, both electrodes are in direct contact with the EO material. In operation, the poling electric field is loaded by both the upper and lower electrodes 202, 210, which in turn is applied to the layer of optical material 208 sandwiched therebetween.

The substrate 204 may be any substrate for fabrication of photonic device, which can be made of glass, silicon, borosilicate, or ceramic. Preferably, the substrate 204 is opaque to minimize any adverse impact on the electro-optic effect during operation. The cladding 206 may be any conductive material which has a refractive index smaller than that of the optic material, e.g., EpoClad.

The optic material may be any materials capable of undergoing an electro-optic activity when subjected to a voltage bias across the pair of electrodes 202, 210. Preferably, the optic material is an organic non-linear optical material, e.g. a host polymer containing a guest non-linear optical material, such as a side-chain polymer containing non-linear optical chromophores, a side-chain polymer containing binary non-linear optical chromophores, a dendrimer containing non-linear optical chromophores, a cross-linkable polymer containing non-linear optical chromophores, and a cross-linkable dendrimer containing non-linear optical chromophores. In addition, the optic material may include a pyroelectric material, such as a ferroelectric material that is arranged to generate an electrostatic field when subjected to the voltage bias. In one embodiment, the optical material is in the form of an EO polymer film.

Each electrode 202, 210 is made of a conductive material and includes a non-metallic portion 212, 216, e.g. made of graphene, and a metallic portion 214, 218, e.g. made of gold, and connected to the non-metallic portion 212, 216, as well as to the respective positive and negative terminals of a voltage source which generates the poling electric field. The non-metallic portions 212, 216 may include one or more layers of graphene films. Preferably, the non-metallic portions 212, 216 are the main component of the electrodes 202, 210 arranged to generate and apply an electric field to the optic material upon subjected to a voltage bias to activate the electro-optic effect. As such, the metallic portions 214, 218 are only required to occupy a small area of the electrodes 202, 210 that is sufficient for serving as an electrical contact for connection to the voltage bias. In the illustrated embodiment, both metallic portions 214, 218 are arranged on an edge of the electrodes 202, 210.

Such arrangement of EO structure allows the electric field in the EO polymer generated by the applied voltage to depend only on the resistance of the EO polymer film, thus minimizing the poling voltage required. More importantly, such arrangement provides numerous options of the material and the thickness of the cladding 206.

In addition to being activated when subjected to a voltage bias as discussed above, the EO activity may be activated when the layer of optic material 208 is heated from, e.g. an ambient temperature, to a temperature close to the glass transition temperature or a cross-linking temperature of the optic material, or when the layer of optic material 208 is cooled from a temperature close to the glass transition temperature of the optic material to, e.g. an ambient temperature. The EO activity of the optic material may, alternatively or additionally, include a change in the EO coefficient of the optic material after poling, e.g. to 80-90 pm/V at a wavelength of 1541 nm or 100-120 pm/V at a wavelength of 1300 nm, a change in the refractive index of the layer of optical material 208 after poling, e.g. from an isotropic refractive index to an anisotropic refractive index, a change in alignment of the guest non-linear optical material after poling, e.g. to being aligned with a non-centrosymmetric order.

Figure 3:
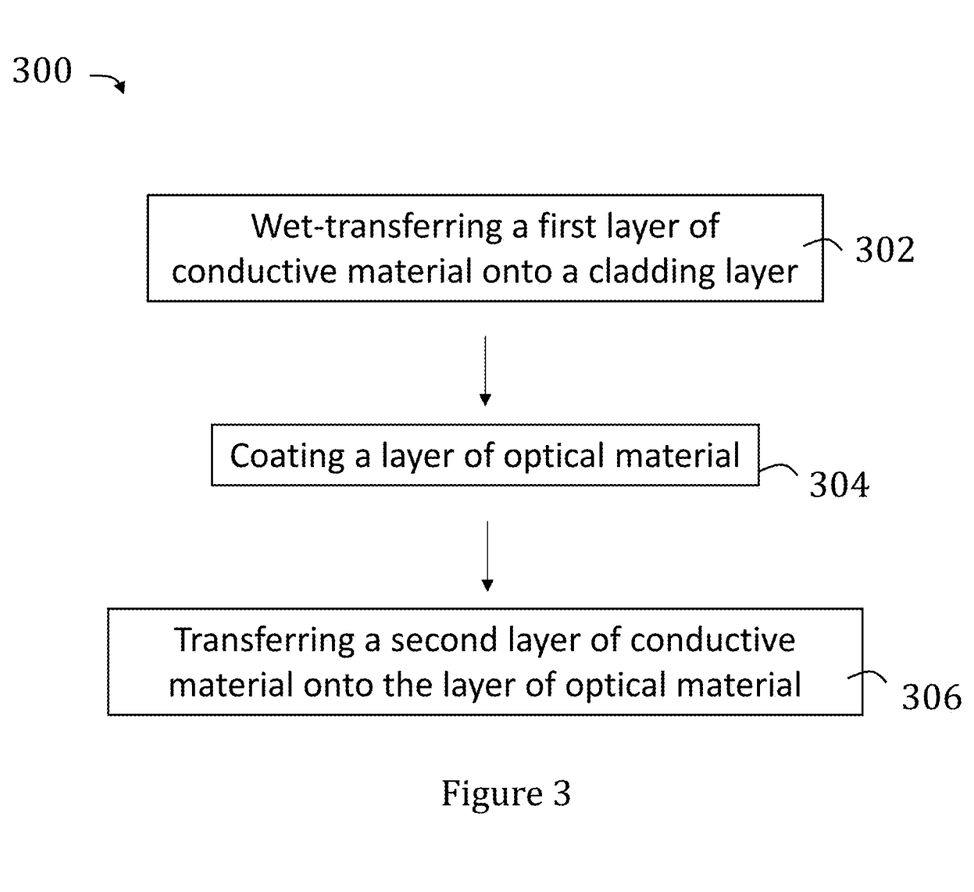
FIG. 3 is a flow chart of a method of manufacturing a photonic device structure in accordance with one embodiment of the invention.

FIG. 3 shows a method 300 of manufacturing the photonic device structure 200. The method 300 begins in step 302, where a first layer of conductive material, e.g. graphene, is wet-transferred onto the cladding layer 206 to form the lower electrode 202. In some embodiments, the first layer of conductive material may include a polymer in addition to graphene, the method 300 further includes a step of removing the polymer from the first layer of conductive material, to ensure for an effective conductivity of the final electrode 202. Then, in step 304, a layer of optical material 208, e.g. EO polymer, is coated on the lower electrode 202. For example, the layer of optical material 208 may be spin-coated onto the lower electrode 202. Next, in step 306, a second layer of conductive material, e.g. graphene, is transferred onto the layer of EO polymer 208, forming the upper electrode 210. This step 306 may be repeated to obtain an upper electrode 210 with different layers of the conductive material. Optionally, to obtain a uniform contact between the layer of EO polymer 208 and both electrodes 202, 210, the three layers 208, 202, 210 may be heated to a temperature close to the glass transition temperature of the EO polymer.

For example, the structure 200 of FIG. 2 may be fabricated in an exemplary embodiment, in which a thick (>10 µm) EpoClad film was first spin-coated on a silicon substrate and the film was thermally cured. Then, a 5-mm wide Au patch (~50 nm) was sputtered near the edge of the EpoClad film to facilitate bottom electrode contact. Next, a 1.8×1 cm2 graphene/PMMA bilayer (SixCarbon technology, Shenzhen) was wet-transferred onto the EpoClad film and the PMMA was removed by acetone. The graphene film covered part of the Au patch. Next, an EO polymer film was spin-coated on the graphene film. Due to the large viscosity of the EO polymer, the quantity of the EO polymer in the spinning process can be controlled as desired, so that the Au-connected part of the bottom graphene electrode was left uncoated. Next, a 5-mm wide Au patch (~50 nm) was sputtered on one side of the EO polymer film to facilitate top electrode contact. Then, two separate graphene/PMMA bilayers (with an area of ~1.0×1.0 cm2 each) were transferred onto the EO polymer film side-by-side, one of which covered part of the Au patch. To ensure uniform contact between the graphene films and the EO polymer film, the sample was heated to a temperature near the glass transition temperature of the EO polymer. The thin PMMA layer (~300 nm) was kept in the transfer of the graphene films, as removal of the PMMA layer by acetone would damage the EO polymer film. This thin PMMA layer does not significantly affect the loss of the sample, as confirmed by the simulation.

The inventors also tested the devices fabricated in accordance with embodiments of the present invention to determine the dependence of the graphene-induced loss on the parameters of poled EO polymers. In one experimentation, EpoClad (Micro Resist Technology GmbH), which has a refractive index of 1.5595 measured at the wavelength 1537 nm, was used as the cladding material. EpoClad is a durable polymer material with a high glass transition temperature that has been employed to form waveguides embedded in printed circuit boards. The graphene-induced losses of the $TM_0$ mode was calculated with a commercial mode solver (COMSOL) for different parameters of the EO polymer film, where the monolayer graphene electrodes are modeled as conductive boundaries with a complex conductivity of $6.084 \times 10^{-5} - j7.519 \times 10^{-6}$ at 1550 nm and the material losses of the substrate, the cladding, and the EO polymer are ignored. The refractive index of the EO polymer film after poling depends on the strength of the poling electric field and the EO polymer. The poling process results in an EO coefficient $r_{33}$, which mainly affects the TM polarization. Before poling, the EO polymer film has an isotropic refractive index. After poling, the EO polymer becomes anisotropic; the refractive index perpendicular to the surface of the waveguide (i.e., along the z direction shown in FIG. 2) increases significantly, while the refractive indices parallel to the waveguide surface (i.e., along the x and y directions shown in FIG. 2) decrease slightly. In the calculation, the refractive index of the EO polymer film along the z direction was varied from 1.58 to 1.68, while the refractive indices along the x and y directions were fixed at 1.58.

Figure 4A:
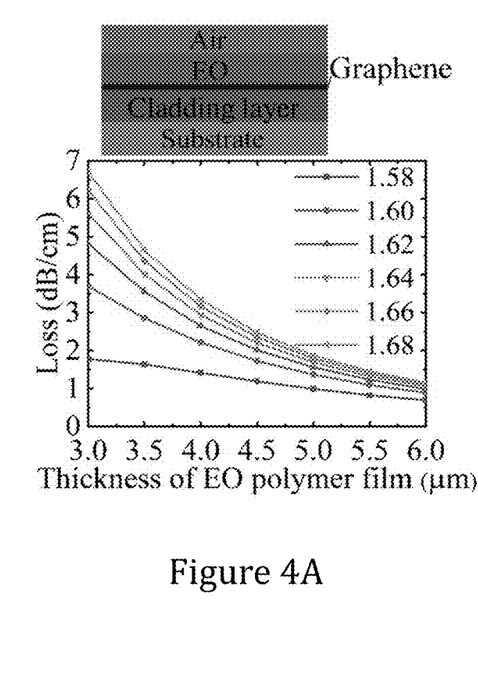
FIG. 4A is a graph of the dependence of graphene-induced loss of the $TM_0$ mode at 1550 nm on the thickness of the electro-optic (EO) polymer film calculated at different refractive indices (in the z direction shown in FIG. 2) of the EO polymer of a photonic device structure with only a bottom graphene electrode.
Figure 4B:
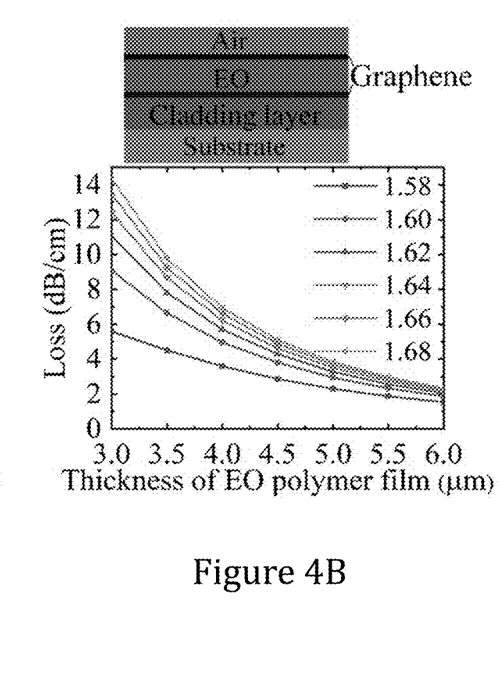
FIG. 4B is a graph of the dependence of graphene-induced loss of the $TM_0$ mode at 1550 nm on the thickness of the EO polymer film calculated at different refractive indices (in the z direction shown in FIG. 2) of the EO polymer of a photonic device structure with both a top graphene electrode and a bottom graphene electrode.

FIG. 4A shows the results for the case where only the bottom graphene electrode is present and FIG. 4B shows the results for the case that both the bottom and the top graphene electrode are present. A comparison of these two sets of results shows that the top electrode induces a slightly larger loss than the bottom electrode. As shown in FIGS. 4A and 4B, the graphene-induced loss decreases with an increase in the thickness of the EO polymer film, which can be explained by the fact that a stronger light confinement in the EO polymer film with a thicker film leads to a weaker mode field at the graphene electrodes and hence a smaller graphene-induced loss. In general, a large refractive index of the EO polymer leads to a larger graphene-induced loss, which can be explained by the increase in the evanescent field caused by the larger refractive-index contrast. To keep the graphene-induced loss low, we should choose a sufficiently large thickness for the EO polymer film. With a thick enough EO polymer film, the graphene-induced loss becomes insensitive to the refractive index of the EO polymer.

The EO polymer used is a simple guest-host system by doping 15 wt % of dipolar polyene chromophore AJLZ53 into the random copolymer poly(styrene-co-methyl methacrylate) (hereafter AJLZ53/P(S-co-MMA)). A 6.3 wt % of the solid polymer was dissolved in dibromomethane and filtered with a 0.22-µm polytetrafluoroethylene filter to form an EO polymer solution ready for spin-coating.

A reference waveguides as shown FIG. 1 was fabricated for comparison. To fabricate this device, an EpoClad film was first spin-coated on an ITO-coated glass substrate and the film was thermally cured. Next, an EO polymer film was spin-coated onto the cured EpoClad film. To expose the ITO electrode, some of the polymer film was scraped off the substrate. After baking the sample in a vacuum oven at 70° C. overnight, a thin layer of Au (~50 nm) was sputtered onto the EO polymer film as the top electrode. Two reference samples with Au/ITO electrodes were prepared: Sample 1, where the thicknesses of the EpoClad and the EO polymer film were 5.1 µm and 4.0 µm, respectively, and Sample 2, where the thicknesses of the EpoClad and the EO polymer film were 4.5 µm and 3.8 µm, respectively.

In subsequent experiments, to evaluate the effect of poling process of the photonic device structure of FIG. 2 being fabricated, only the part of the EO polymer film covered by the graphene film connected to the Au patch was poled. The other part covered by the graphene film that was not connected to the Au patch was not poled and served as a reference. Two samples with graphene electrodes were prepared: Sample 3 and Sample 4, where the thicknesses of the EO polymer film were 3.5 µm and 3.8 µm, respectively.

Each sample was poled by applying a voltage ramping up gradually from 0 V to a final voltage with a voltage source (Keithley 2657A), while heating up the sample from 40° C. to 115° C. (the glass transition temperature of the EO polymer) at a rate of 10° C./min with a hot stage. The resistivity of EO polymer was measured to be in the range of $6 \times 10^8$-$2 \times 10^9$ Ω·m and that of EpoClad was comparable (~$10^9$ Ω·m). For Samples 1 and 2, the final voltages used were 910 V and 800 V, respectively, and the corresponding electric fields in the EO polymer films were estimated to be ~100 V/µm (assuming the same resistivity for EpoClad and the EO polymer). For Samples 3 and 4, the final voltages used were 350 V and 420 V, respectively, and the corresponding electric fields in the EO polymer films were 100 V/µm and 110 V/µm. The poled areas of Samples 1, 2, 3, and 4 were ~1.2 $cm^2$, ~0.66 $cm^2$, ~1.0 $cm^2$, and ~1.0 $cm^2$, respectively.

Figure 5:
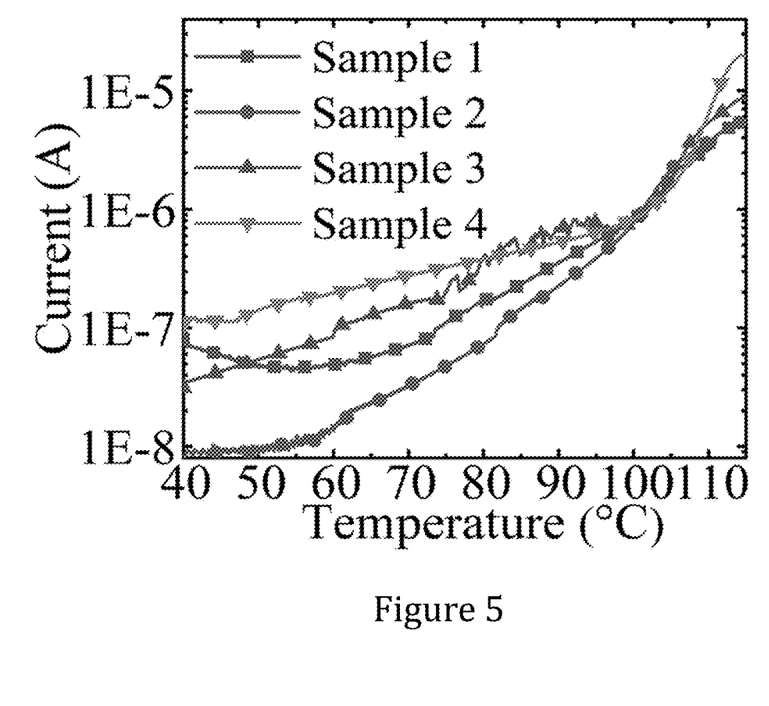
FIG. 5 is a graph showing variations of the leakage current with the temperature during poling of four sample photonic device structures.

During the poling process, the leakage current was monitored. The rotation of chromophores and polymer chains at the poling voltage and the high temperature gave rise to a rapid increase in the leakage current by more than two orders of magnitude, which is a signature of the completion of the poling process. The variations of the leakage current with the temperature during the poling of the four samples are shown in FIG. 5. The rising of the leakage current reflects the poling characteristics. The leakage currents for Samples 1 and 2 are smaller than those for Samples 3 and 4, which is due to the presence of buffer layers in the first two samples. As the buffer of Sample 1 is thicker than that of Sample 2 (5.1 µm versus 4.5 µm), the poling voltage required for Sample 1 is higher than that of Sample 2. On the other hand, the poling voltages for Samples 3 and 4, which do not contain any buffer layers, are much lower than those for Samples 1 and 2. Furthermore, the leakage current for Sample 4 has the largest value, which indicates that this sample should experience the highest electric-field strength and hence show the best poling result.

Figure 6A:
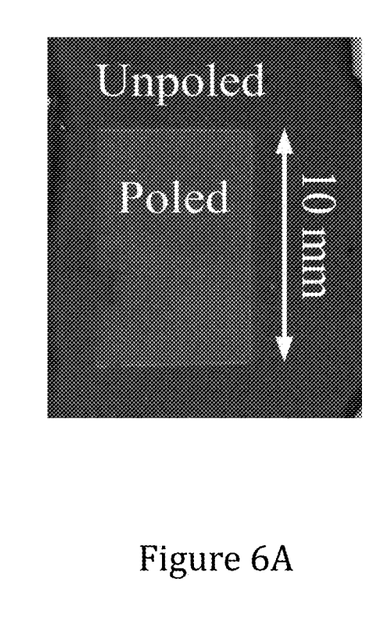
FIG. 6A is an image of a poled sample 2 in FIG. 5, showing the poled and unpoled areas on the sample.
Figure 6B:
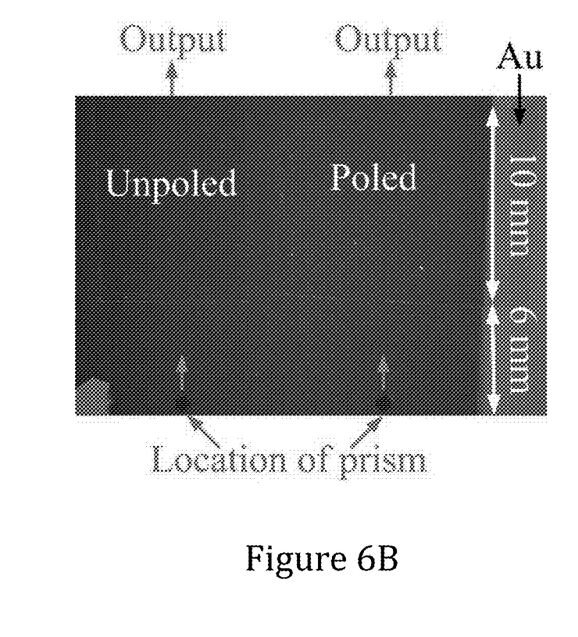
FIG. 6B is an image of a poled sample 4 in FIG. 5, showing the poled and unpoled areas on the sample, as well as the locations of the prism together with the optical paths for the measurement of the transmission of the $TM_0$ mode through the poled and unpoled areas.

After poling, the samples were cooled down to room temperature for further analysis and measurement. For Samples 1 and 2, the Au top electrodes was removed with an Au etchant solution. Because the poling process changed the optical absorbance and the refractive index of the EO polymer, the poled and unpoled areas on Samples 1 and 2, which were formed on transparent glass substrates, showed slightly different colors and could be easily differentiated by naked eyes, as shown in FIG. 6A. On the other hand, visible differentiation of the poled and unpoled areas on Samples 3 and 4 was difficult, as shown in FIG. 6B, as these samples were formed on opaque silicon substrates.

The refractive indices, the EO coefficients $r_{33}$, and the propagation losses of the samples were measured with a commercial prism-coupler system (Metricon 2010). Before poling, the refractive indices of the EO polymer films were ~1.58 and ~1.59 for both polarizations at the wavelengths 1541 nm and 1300 nm, respectively. After poling, the refractive indices for the TM polarization were increased significantly, which means that the poled EO polymer films became highly birefringent. The EO coefficients $r_{33}$ of Samples 3 and 4 were measured by directly applying a voltage to each sample and measuring the refractive-index change $\Delta n$. The EO coefficient can be estimated from the expression $r_{33} = 2 \Delta n/n^3 E$, where n is the refractive index of the EO polymer after poling and E is the applied electric field. Because the resistance ratio between EpoClad and the EO polymer was not accurately known, an accurate estimate of the $r_{33}$ values for Samples 1 and 2 could not be provided with this direct measurement method. Nevertheless, by comparing the birefringence values of the EO polymer films of the samples and assuming that the $r_{33}$ value is linearly proportional to the birefringence, the $r_{33}$ values of Samples 1 and 2 could be estimated.

Table 1 summarizes the refractive indices for the TE and TM polarizations (denoted as $n_{TE}$ and $n_{TM}$, respectively) and the $r_{33}$ values for the four poled samples at 1300 nm and 1541 nm. In consistency with the poling characteristics shown in FIG. 5, Sample 4 shows the largest $r_{33}$ value, as well as the largest birefringence, while Sample 1 shows the smallest $r_{33}$ value, regardless of the highest poling voltage used. Poled with a lower voltage, Sample 2 exhibits a larger EO effect than Sample 1, which is due to the use of a thinner buffer layer. Sample 3 shows a smaller $r_{33}$ value than Sample 4, because of the use of a lower poling electric field. The highest birefringence values achieved in our work (from Sample 4) are 0.044 at 1541 nm and 0.06 at 1300 nm, and the corresponding $r_{33}$ values are 82 pm/V and 110 pm/V, which are about three times of those of lithium niobate. These values compare well with those reported for similar EO polymer poled with conventional electrodes. These experiments confirm the feasibility of poling EO polymer at low voltages with graphene electrodes.

TABLE 1

Summary of poling results for Samples 1, 2, 3, and 4 (denoted as S1, S2, S3, and S4, respectively).

| | Poling Voltage (V) | $n_{TE}/n_{TM}$ at 1300 nm | $n_{TE}/n_{TM}$ at 1541 nm | $r_{33}$ at 1300 nm pm/V | $r_{33}$ at 1541 nm pm/V |
|---|---|---|---|---|---|
| S1 | 910 | 1.59207/ 1.62082 | 1.57676/ 1.59824 | 70 | 33 |
| S2 | 800 | 1.58802/ 1.63826 | 1.57362/ 1.61040 | 100 | 67 |
| S3 | 350 | 1.58635/ 1.62818 | 1.57256/ 1.60368 | 91 | 54 |
| S4 | 420 | 1.58532/ 1.64593 | 1.57276/ 1.61682 | 110 | 82 |

No visible damages on the EO polymer films were observed after poling. To check whether poling with graphene electrodes might affect the optical loss of the EO polymer, the transmission losses of the $TM_0$ modes for Samples 3 and 4 were measured using the prism-coupler system. The $TM_0$ mode guided by the EO polymer film was excited with a collimated laser beam (at 1537 nm) through a high-index prism placed on the area without graphene electrodes. The guided $TM_0$ mode passed through the area with graphene electrodes and was detected at the end of the waveguide. The transmission was measured for the poled area and the unpoled area, respectively. The locations of the prism and the optical paths for the poled and unpoled areas for Sample 4 are shown in FIG. 6B (the layout for Sample 3 is similar). As the optical paths for the probing of the poled and unpoled areas were the same, which, as shown in FIG. 6B, consist of a 6-mm path without graphene electrodes and a 10-mm path with graphene electrodes, a comparison of the output powers from the two measurements gave the poling-induced loss directly. The poling-induced losses measured in this way for Samples 3 and 4 were ~0.3 dB and ~1.0 dB, respectively. The larger poling-induced loss in Sample 4 could be attributed to the larger birefringence in Sample 4, which, as shown in FIG. 4B, should lead to a larger graphene-induced loss.

Several reference samples were prepared, including one that contained only a 3.7-μm thick EO polymer film on a thick EpoClad cladding (i.e., no graphene electrodes), one that contained a waveguide with the bottom graphene electrode, and one that contained a waveguide with both the bottom and the upper graphene electrode. The sliding prism method was applied to these samples and a propagation loss of 2.2 dB/cm obtained for the sample without graphene, 6.2 dB/cm for the sample with the bottom graphene electrode, and 10.6 dB/cm for the sample with both graphene electrodes were obtained. The experimental results agree reasonably well with the calculated results, considering the uncertainties in the measurements and the presence of non-uniformity for such large area waveguides. In most practical applications, only a short length of EO polymer film is needed and an upper cladding with a matching refractive index is usually applied, which can reduce the graphene-induced losses. The use of a thicker EO polymer film, as shown in FIGS. 4A and 4B, can significantly reduce the graphene-induced loss. The reason of using relatively thin EO polymer films in herein is to limit the poling voltage required for ITO/Au electrodes and ensure single-mode operation.

The above embodiments of the invention have provided a photonic device using low-loss graphene electrodes for producing electro-optic activity in EO materials with a poling method. Advantageously, the application of graphene as poling electrodes not only simplifies the fabrication of an EO device, but also helps reduce the poling voltage, without introducing significant additional optical loss to the EO material.

In addition, the use of graphene electrodes can do away with buffer layers required for traditional metal electrodes thus minimize the poling voltage. High EO coefficients of 82 pm/V at 1541 nm and 110 pm/V at 1300 nm were achieved with a poling voltage of only 420 V, which is much lower than that required by using traditional metal electrodes. The use of graphene electrodes for poling allows the use of inexpensive cladding material and more flexible waveguide designs. The upper graphene electrode can be further patterned to form low-loss modulation electrodes for the EO device to be made. Such a graphene/EO polymer hybrid platform can be explored as a key solution to overcome the traditional tradeoff between poling efficiency and optical loss and significantly simplify the design and fabrication of waveguide devices based on EO polymer.

It will be appreciated by persons skilled in the art that numerous variations and/or modifications may be made to the invention as shown in the specific embodiments without departing from the spirit or scope of the invention as broadly described. The described embodiments of the invention should therefore be considered in all respects as illustrative, not restrictive. For example, the photonic device structure may have a different structure as that illustrated, provided that the cladding is adjacent to the electro-optic structure. The illustrated photonic device structure may be made by a method different from that illustrated. The illustrated method may be used to manufacture a photonic device structure other than that illustrated.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An electro-optic waveguide comprising:
   an electro-optical structure including a layer of optical material sandwiched by a pair of electrodes, each of the pair of electrodes comprising a non-metallic portion having graphene, wherein the layer of optical material is arranged to undergo an electro-optic activity when subjected to a voltage bias across the pair of electrodes; and
   a cladding layer adjacent to the electro-optical structure.

2. The electro-optic waveguide in accordance with claim 1, wherein the electro-optic activity includes a change in the electro-optic coefficient of the layer of optical material.

3. The electro-optic waveguide in accordance with claim 2, wherein the electro-optic coefficient is 80-90 pm/V at a wavelength of 1541 nm or 100-120 pm/V at a wavelength of 1300 nm.

4. The electro-optic waveguide in accordance with claim 1, wherein the electro-optic activity includes a change in the refractive index of the layer of optical material.

5. The electro-optic waveguide in accordance with claim 4, wherein the refractive index is changed from an isotropic refractive index to an anisotropic refractive index.

6. The electro-optic waveguide in accordance with claim 1, wherein the non-metallic portion comprises one or more layers of graphene films.

7. The electro-optic waveguide in accordance with claim 1, wherein each of the pair of electrodes further comprises a metallic portion.

8. The electro-optic waveguide in accordance with claim 7, wherein the metallic portion comprises gold.

9. The electro-optic waveguide in accordance with claim 7, wherein the metallic portion is positioned on an edge of each of the pair of electrodes.

10. The electro-optic waveguide in accordance with claim 1, wherein the layer of optical material comprises an organic non-linear optical material.

11. The electro-optic waveguide in accordance with claim 10, wherein the layer of optical material comprises a host polymer containing a guest non-linear optical material.

12. The electro-optic waveguide in accordance with claim 11, wherein the host polymer is selected from a group consisting of: a side-chain polymer and a dendrimer.

13. The electro-optic waveguide in accordance with claim 11, wherein the guest non-linear optical material is a plurality of non-linear optical chromophores.

14. The electro-optic waveguide in accordance with claim 13, wherein the electro-optic activity includes a change in alignment of the guest non-linear optical material.

15. The electro-optic waveguide in accordance with claim 14, wherein the guest non-linear optical material is aligned with a non-centrosymmetric order when subjected to the voltage bias across the pair of electrodes.

16. The electro-optic waveguide in accordance with claim 1, wherein the layer of optical material comprises a pyro-electric material.

17. The electro-optic waveguide in accordance with claim 16, wherein the layer of optical material comprises a ferroelectric material.

18. The electro-optic waveguide in accordance with claim 17, wherein the ferroelectric material is arranged to generate an electrostatic field when subjected to the voltage bias.

19. The electro-optic waveguide in accordance with claim 1, wherein the layer of optical material is further arranged to undergo the electro-optic activity when heated at the glass transition temperature of the optical material.

20. The electro-optic waveguide in accordance with claim 1, wherein the layer of optical material is further arranged to undergo the electro-optic activity when cooled from the glass transition temperature of the optical material.

21. The electro-optic waveguide in accordance with claim 1, wherein the pair of electrodes comprises an upper electrode above the layer of optical material, and a lower electrode between the layer of optical material and the cladding layer, and wherein the upper electrode comprises a patterned structure.

* * * * *